United States Patent [19]
Dixon

[11] Patent Number: 4,521,021
[45] Date of Patent: Jun. 4, 1985

[54] VIDEO GAME TABLE FOR AIRLINES COMMERCIAL VEHICLES OR THE LIKE

[76] Inventor: Claude E. Dixon, 104 Spree Ave., Grass Valley, Calif. 95945

[21] Appl. No.: 463,005

[22] Filed: Feb. 1, 1983

[51] Int. Cl.³ .............................................. A63F 9/22
[52] U.S. Cl. ..................... 273/148 B; 273/DIG. 28; 297/163; 358/254; 108/28; 108/45
[58] Field of Search ...................... 273/DIG. 28, 309; 108/28, 45; 297/163–166; 358/254

[56] References Cited

U.S. PATENT DOCUMENTS

| | | | |
|---|---|---|---|
| 614,722 | 11/1898 | Isaacs | 312/227 |
| 2,211,962 | 8/1940 | Morris | 108/28 |
| 2,454,691 | 11/1948 | Ellingson | 273/309 |
| 3,049,374 | 8/1962 | Nance | 297/163 |
| 3,596,987 | 8/1971 | Wilson | 297/163 |
| 3,773,381 | 11/1973 | Brennan | 108/45 |
| 3,940,136 | 2/1976 | Runte | 273/85 R |
| 4,156,921 | 5/1979 | Wenninger et al. | 364/744 |
| 4,247,106 | 1/1981 | Jeffers et al. | 273/DIG. 28 |
| 4,312,507 | 1/1982 | Smith et al. | 273/237 |

FOREIGN PATENT DOCUMENTS

| | | | |
|---|---|---|---|
| WO82/03318 | 10/1982 | PCT Int'l Appl. | 297/163 |
| 878933 | 10/1961 | United Kingdom | 297/163 |
| 1342284 | 1/1974 | United Kingdom | 297/163 |

OTHER PUBLICATIONS

Boeing, "*Proceedings of the SCAR Conference,*" Mar. 1977, p. 864, FIG. 15.

Primary Examiner—Anton O. Oechsle
Assistant Examiner—Leo P. Picard
Attorney, Agent, or Firm—Flehr, Hohbach, Test, Albritton & Herbert

[57] ABSTRACT

A video console for passenger vehicles having a video display integrally formed as a table positioned within a recess of an adjacent passenger seat forwardly disposed of the intended user, rotated from a stored to an access position, the video display table having separable top and bottom surfaces providing access to an interior with instrumentalities disposed therein for providing amusement and educative benefits.

11 Claims, 3 Drawing Figures

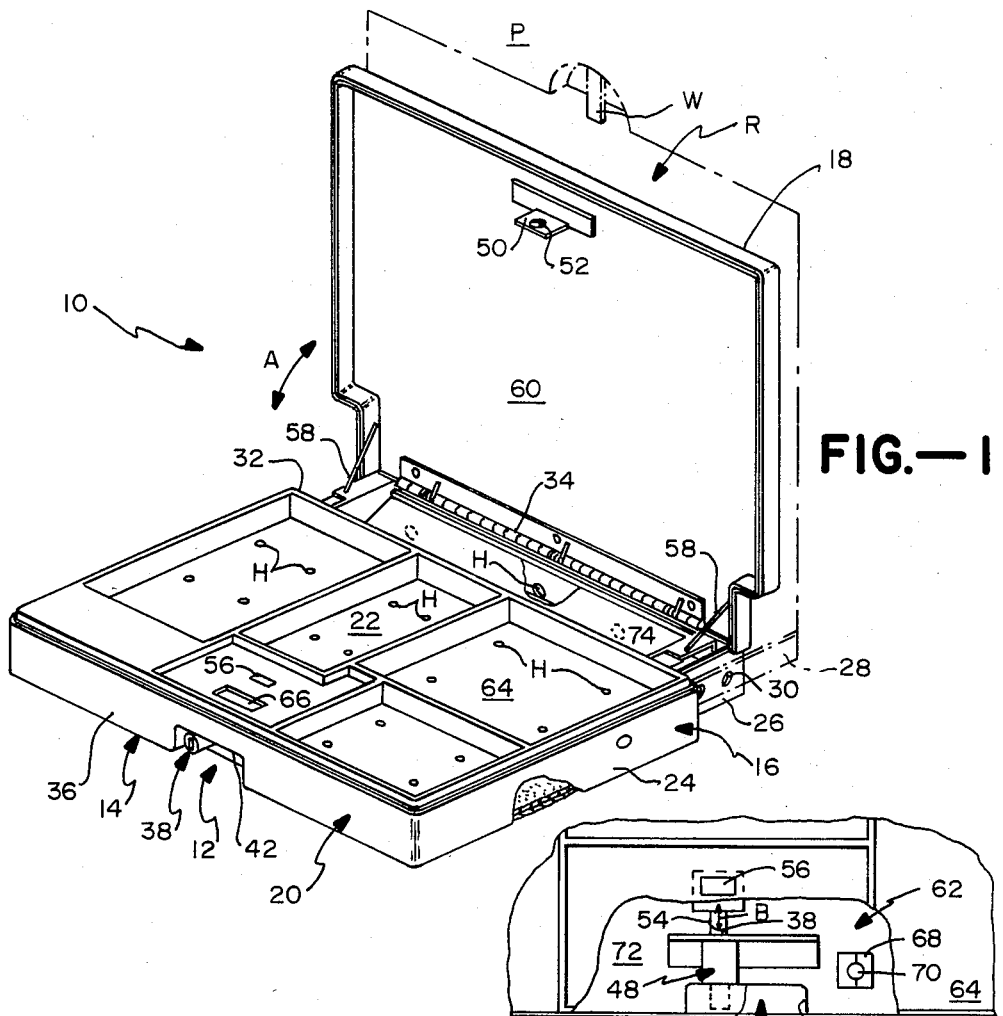

VIDEO GAME TABLE FOR AIRLINES COMMERCIAL VEHICLES OR THE LIKE

BACKGROUND OF THE INVENTION

The following invention relates generally to tables conventionally found on passenger airlines, trains, buses boarding areas and the like suitably formed to have disposed thereon food, comestibles, drinks etc., which when modified as is to be disclosed hereinafter incorporate a video game or games integral therewith.

It is common knowledge that video games are at the forefront of the coin operated amusement industry in society today. Additionally, society's exposure to computers has provided the layman with the ability to access information and engage upon certain educative and entertainment excercises heretofore unattainable by conventional means. It is reasonably safe to say that the average citizen of today has, through exposure to video devices, come to accept them as necessary items.

The following citations reflect the state-of-the-art of which applicant is aware, insofar as they appear to be germane to the process at hand.
U.S. Pat. No. 614,722—J. L. Isaacs—Nov. 22, 1898
U.S. Pat. No. 3,940,136—R. R. Runte—Feb. 24, 1876
U.S. Pat. No. 4,156,921—F. W. Wenninger et al.—May 29, 1979
U.S. Pat. No. 4,312,507—B. E. Smith et al—Jan. 26, 1982

The patent to Smith et al. teaches the use of a portable lighted study or game tray which has a portion which pivots from a first to a second position. A cover 15 is provided which exposes a game playing area or the like, the cover is adapted to protect the game indicia such as a checkerboard shown in FIG. 2.

The patent to Runte teaches the use of an amusement device which includes a support that allows the surface of the amusement device to be pivoted from a first operative position to second servicing position to allow access to the interior portion of the device itself.

The patent to Isaacs shows a very old form of game or work table having a foldable lid, and the remaining citation shows the state-of-the-art further.

The instant application is distinguished over the known prior art in that it is hollow and contains a plastic insert to which are attached a plurality of battery operated hand held electronic games and each otherwise secured in its own recessed cubicle.

The invention when in place resembles the replaced table. The inventive device is composed of a lid on the top that seats over a tray (receptacle) on the bottom. Contained within the tray is the plastic insert mentioned above which holds the electronic games.

When the unit is in a locked position the special locking device is not visible and this can readily be seen by an attendant. When the unit is unlocked the special locking device protrudes approximately ½-182 of an inch and is readily observable.

As the special lock is closed, the dead bolt part trips a counter and then continues through an opening which is part of a protrusion attached to the lid for a secure fit.

The tripped counter accurately records the number of times the game table is opened and closed and the numbers are readily seen through a plastic viewer.

Between the insert and the inside bottom of the receptacle is a spring loaded device that acts as an alarm system if unauthorized persons attempt to remove the games or the insert.

There is a ⅛" foam material affixed to the bottom of the tray to act as a noise reducing factor. Where the game table attaches to the protruding arms of the seat; the table is reinforced on each side by special metal plates of approximately 1¼ by 1¼ by 5/6 inch thickness and designed to replace the rod that existed on the replaced table for support.

The outer part of the table is made of plastic bonded around and affixed to aluminum plating formed into the shape of a tray and a lid with the lid seating around the bottom tray to a depth approximately one-half (½) inch and for the particular purpose of inhibiting attempts to tamper with the tray.

When the invention is opened, the lid remains in an upright opened position by means of a series of coiled springs that are attached to the piano hinge—that secures the lid to the bottom of the unit.

Below the piano hinge and halfway to the bottom of the tray are 4 holes of ⅛" diameter equally spaced from each other and are designed to allow the release of fluids in the event of liquid spillage into the unit.

The plastic insert is one unit of molded plastic, easily installed and easily removed and is secured in place by one screw inserted through an opening on each exterior side of the unit and through the outer wall of the plastic insert. The screw head is designed to accept a unique allen wrench size.

The bottom of the plastic insert is channeled to allow the passage of water in the event of spillage and there are 4 holes of ¼ inch diameter in each game mold separately spaced one inch apart to help reduce the effects of any noise.

Two screws are inserted through the bottom of the plastic into each individual game at a spot not likely to interfere with the operation of the game but will allow the game to be secured.

When the game is open and the lid is in an upright position, the lid is restrained from over opening by two chains of small diameter of approximately 4" in length and attached singly on each side to the lid and the tray at a point equidistant to both and at the rear and bottom of the tray in the area of the piano hinge.

At the slot opening where the locking protrusion of the lid lock penetrates through the plastic insert into the bottomn of the tray to receive the dead bolt; there is a self closing plastic cover that is pushed aside by the protruding lid lock device and completely seals the opening when the lock protrusion is withdrawn.

It is anticipated that the present majority of uses of this invention device will be as a replacement table for all present and existing airplane tables and for other commercial passenger behicles such as buses, trains and cars.

The inventive device is also capable of being mounted on individual stands such as might be found in the waiting room lobbys of buses, trains and planes to provide entertainment and relaxation while waiting for passengers.

The unit is also capable of being used as a portable unit for susch purposess as being taken to the beach or to sporting events, etc.

The invention as structured is intended to accept therewithin a television screen in the lid, visible when opened and controlled by a touch pad type system in the bottom tray.

The unit in the bottom tray will accept cartridges of a variety of games and subjects, educational and informative and of selected advertising.

Long range use of the units will allow a full range and scale of computer activities and interfacing to provide inflight stock market reports, etc.

SUMMARY AND OBJECTS OF THE INVENTION

Accordingly, this invention has as its objective the provision of a video game table for airlines, trains, buses and other vehicles or the like to provide amusement and educative capabilities.

It is still another object of this invention to provide a device as is characterized above which is integrally formed with the tray commonly found in most of these vehicles.

A further object of the invention contemplates providing as characterized above which occupies a minimal amount of space, can be unobtrusively stored when not in use, and can be readily deployed.

A still further object of this invention contemplates providing a device as characterized as above which is durable in construction, easy to use, and lends itself to mass production techniques.

It is still yet another object of the invention to provide a device as characterized above which can perform a multiplicity of functions as directed by the individual user.

It is still yet a further object of this invention to provide an array or plurality of such devices within a single vehicle, all of which are operatively connected to a central control unit for economy.

These and other objects will be made manifest when considering the following detailed specification when taken in conjunction with the appended drawing figures wherein there has been provided a video game table suitable formed and adapted to define the tray commercially found on most passenger airlines, trains, buses and other vehicles which in one form of the invention is integrally formed with the serving tray itself. The table which pivots from a first stored position to an open exposed position includes a game board area either on the screen, or on the exposed portion of the table when opened in combination with a plurality of key means for accessing data or manipulating the video game table as is required.

Other objects and benefits will be made evident when considering the following detailed specification taken in light of the appended drawing figures.

DESCRIPTION OF THE DRAWING FIGURES

FIG. 1 is a perspective view of a possible one form of the invention according to the instant application, with a cut-away showing further detail.

FIG. 2 is a top plan view of a portion of FIG. 1 showing the latch mechanism..

FIG. 3 is a front view of a second possible configuration thereof.

BRIEF DESCRIPTION OF THE PREFERRED EMBODIMENT

Referring to the drawings now, wherein like reference numerals refer to like parts throughout the various drawing figures, reference numeral 10 is directed to the video display according to the present invention.

As is shown, the video display is adapted to be disposed and nested within a recess R on the back face of a passenger seat P, the recess commonly found on commercial type airlines. A pivotal wing tab W coacts with a recessed surface 12 on an exposed surface 14 of the video display 10 when the video display is in a stored position.

The video display 10 is formed as a table 16 provided with a top surface 18, the exposed bottom surface 14 and a peripheral wall 20 which allows the top surface and exposed bottom surface to rotatably reside in fixed spaced apart relation when opened providing an interior 22.

As is known, conventional type tables have a longitudinal extent greater than its latitude, the latitudinal portion 24 of the peripheral wall having an area 26 defining a necked down portion adapted to receive thereon hinges 28 affixed thereto by screws 30 as is known in the art so that the video display table 16 can pivot from a first position to a second. The hinges 28 are suitably affixed to the recess area R of the rear face of the passenger seat.

As shown in the drawing figures, the top surface 18 is separable from the exposed bottom surface 14 in the following manner. The longitudinal edge wall 32 adjacent the passenger seat recess R is provided with a hinge 34 which allows the top surface 18 to be pivoted away from the exposed bottom surface 14 in the direction of the arrow A. A latch means on the longitudinal edge wall 36 remote from the longitudinal edge wall 32 is provided with latching means 38 to selectively rotate the top surface from the bottom surface thereby exposing the interior 22. More specifically, the recessed surface 12 of the one longitudinal edge wall 36 extends along a portion of the exposed bottom surface 14 thereby providing a cavity 40 which includes a raised surface 42 and a peripheral ledge 44 formed as three walls, so that the wing tab W can be rotated and engage the raised surface 42 for storage. In addition, the peripheral ledge 44 has a central portion 46 provided with a lock means 48 which allows access to the interior of the video display.

More particularly, a lock means 48 is key operated and is adapted to register with a tab member 50 extending downwardly from an interior wall 60 of top surface 18, tab 50 having an aperture 52 adapted to register with a sliding bolt 54 of the lock 48 whereby retraction of the sliding bolt provides clearance by its removal from the aperture 52 to allow the top surface 18 to rotate about the hinge 34 in the direction of the arrow A. A windowed countering means 56 is placed in registry with the sliding bolt so that reciprocation of the bolt indexes the counting means along the arrows B and denotes the number of times the table has been opened so that an accurate accounting for the times the devices has been used can be made manifest not only for placement of battery packs, but also for revenue since it is contemplated that this device be fee oriented. Thus, a counter display is integral with the counter means for this purpose. As shown, the lock means 48 is offset from a center line of the tray so as to provide clearance for the wing tab W's operative manipulation.

It is to be noted, therefore, that the device according to the instant application is intended to simply replace conventional tables that are commonly found on commercial airlines for example, and no inordinate or extraordinary modifications to the existing aircraft structure is required.

Once the video display 10 has been oriented from a stored closed position to an open operative position by rotating the top surface 18 relative to the exposed bottom surface 14, a substantially L shaped structure when viewed from the side is provided. The top surface 18 is tethered to the bottom of surface 14 not only by the hinges 34 which may be spring biased, but is also provided with one and preferably two line tethers 58 which extend from the latitudinal walls 24 to the top surface 18 as shown in the drawings.

It is evident that the top surface has an interior wall 60 which is provided with, in a preferred form, a suitable reinforcement as by metal, fiberglass, or the equivalent, and the downwardly extending locking tab member 50 is integral therewith.

The bottom surface 14 includes the peripheral wall 20 which therefore defines an opened topped drawer type structure 62 that is adapted to removably support the specific video game apparatus attached thereto by means of an insert 64. As is shown in the drawing figures, the insert 64 may comprise a typing pad, or a plurality of games fixedly secured in a partitioned insert by nesting, each game defining a device contemplated to amuse and educate the participant. The insert 64 is provided with an opening 66 having a resilient seal which allows the tab member 50 to pass therethrough and register with the latching means 38 but exclude spilled liquids. The insert 64 itself is removable for maintenance by special allen screws connected to surface 14, replacement of games that are currently in vogue, and for inspection of the interior of the drawer 62.

Preferably, an area adjacent the lock 48 is provided with an alarm means 68 including a spring biased push button 70 so that when the insert 64 is removed from the drawing 62 the push button is extended and an audible alarm is provided. This would indicate to flight attendants or the like that access to the drawer interior has been effected, and is intended to reduce the incidence of vandalism or the like. The alarm 68 can be of any known type.

The drawer 62 is provided with a plastic outer layer, metal or fiberglass reinforcement as is the top surface, and a foam layer 72 provides shock and sound absorbing properties for the table.

The interior top surface 60 may include a plurality of indicia thereon, as shown in FIG. 1, the indicia can take the form of instructions on how to play the games associated with the device on the bottom surface contained within the drawer 62, or can take the form of FIG. 2.

In this embodiment, a CRT is formed integrally with the interior wall top surface so that in use and in conjunction with the typing pad, or with the games disposed upon the insert section, flexibility can be provided and a large variety of entertainment can be made available.

Further reinforcement means are provided to enhance the structural rigidity of the device and includes a pair of first and second block members 74 adapted to register with the apertures provided on the necked down area 26 of the latitudinal portion 24 of the peripheral wall 20 so that the screws for the hinges 28 have firm support.

It is contemplated that the information capable of being extracted from this device is not limited to the particular module contained within the drawer 62, but can gain access to a larger body of information contained on or accessible from a central processing unit carried on the plane. For example, a plug-in module can be used to patch the device 10 into either the earphone inputs commonly found on most aircraft wherein the signal derived therefrom is acoustical or from an electrical input so that communication with the central CPU is possible for example. Alternatively, the device can be orchestrated so that games can be played between passengers in remote locations, and if desired communication between passengers at remote locations can be effected by use of the video display terminal or CRT with the typing pad. During the course of a journey, passengers can extract information on current news, sports, business, sights to see at future locations, have the ability to make reservations for restaurants, hotels, or cars. Passengers can also extract information on sights to see when arriving at their destination or alternatively can be provided with a travel guide for terrain they are currently viewing while in progress.

Thus, it should be appreciated that the flexibility associated with the structure according to the instant application provides a means by which passengers can be entertained, can access information, and can structure future events may making arrangements. In addition, it is contemplated that this device can be used for on-board work and subsequent linkage with remote locations so that a person performing work can have data transmitted as is desired.

Moreover, having thus described the invention, it should be apparent that numerous structural modifications are contemplated as being a part of this invention as set forth hereinabove and is defined herein below by the claims.

I claim:

1. A tray table for the seat back of passenger vehicles or the like having an array of passenger seats disposed in rows and columns such that the rows and columns are aligned to provide registry between a back of one seat and front of another seat, said table comprising movable console means including video display means and video control means for said display and said table is provided with means for mounting it to a seat back and for movement independent of the seat back.

2. A seat back tray table as claimed in claim 1 including means to selectively fasten said tray table in a position on said seat back.

3. A seat back tray table as claimed in claim 1 wherein said video display means comprise indicia means for providing information to the person accessing the console.

4. A seat back tray table as claimed in claim 3 wherein said video control means comprise a keyboard.

5. A seat back tray table as claimed in claim 1 including interface means for placing said video display means in communication with a remote source of information.

6. A seat back tray table as claimed in claim 1 wherein said video control means comprise a keyboard and means for controlling said display responsive to said keyboard.

7. The improved airline tray table as claimed in claim 6 including a protective cover over the keyboard.

8. The improved airline tray table as claimed in claim 7 including counter means for counting the number of times the keyboard is used.

9. The improved airline tray table as claimed in claim 8 including locking means for restricting access to the keyboard and display.

10. The improved airline tray table as claimed in claim 9 including counter means coupled to the locking means for tracking the usage of the keyboard.

11. The improved airline tray table as claimed in claim 9 wherein the counter means are responsive to the locking means.

* * * * *